United States Patent
Torii

(10) Patent No.: US 9,150,254 B2
(45) Date of Patent: Oct. 6, 2015

(54) VEHICLE BODY STRUCTURE

(75) Inventor: Nobuyuki Torii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/382,219

(22) PCT Filed: Mar. 23, 2012

(86) PCT No.: PCT/JP2012/057599
§ 371 (c)(1),
(2), (4) Date: Aug. 29, 2014

(87) PCT Pub. No.: WO2013/140624
PCT Pub. Date: Sep. 26, 2013

(65) Prior Publication Data
US 2015/0166110 A1    Jun. 18, 2015

(51) Int. Cl.
*B62D 25/06* (2006.01)
*B62D 21/15* (2006.01)
*B62D 25/02* (2006.01)
*B62D 25/04* (2006.01)

(52) U.S. Cl.
CPC .............. *B62D 21/157* (2013.01); *B62D 25/02* (2013.01); *B62D 25/04* (2013.01)

(58) Field of Classification Search
CPC ....... B62D 21/157; B62D 25/04; B62D 25/06
USPC ........................................ 296/187.12, 193.06
See application file for complete search history.

(56) References Cited

U.S. PATENT DOCUMENTS

| | | | |
|---|---|---|---|
| 6,217,109 B1 | 4/2001 | Okana et al. | |
| 8,029,047 B2* | 10/2011 | Kim et al. | 296/193.06 |
| 2002/0043821 A1 | 4/2002 | Takashina et al. | |
| 2011/0163571 A1* | 7/2011 | Furusako et al. | 296/193.06 |
| 2012/0161475 A1 | 6/2012 | Mori | |
| 2012/0242112 A1* | 9/2012 | Yamamoto | 296/193.06 |

FOREIGN PATENT DOCUMENTS

| | | |
|---|---|---|
| JP | A-2000-219150 | 8/2000 |
| JP | A-2000-302058 | 10/2000 |
| JP | A-2001-71948 | 3/2001 |
| JP | A-2001-163263 | 6/2001 |
| JP | A-2002-120766 | 4/2002 |
| JP | A-2004-322666 | 11/2004 |
| JP | A-2006-321491 | 11/2006 |
| WO | WO 2011/030463 A1 | 3/2011 |

* cited by examiner

*Primary Examiner* — Pinel Romain
(74) *Attorney, Agent, or Firm* — Oliff PLC

(57) ABSTRACT

An object of the present invention is to provide a vehicle body structure in which it is possible to improve a side collision performance of a vehicle. For this reason, a vehicle body structure 1 includes a roof side rail 10 that is disposed at an upper side position of a vehicle, and extends in a longitudinal direction of the vehicle; and a center pillar 14 which extends in a vertical direction of the vehicle, and an upper end portion of which is joined at a position in the way in which the roof side rail 10 extends. Each of fragile portions 20 and 22 is provided at a position apart from a joining spot of the center pillar 14 in the roof side rail 10 so as to have strength lower than that of other portions of the roof side rail 10.

1 Claim, 3 Drawing Sheets

VEHICLE BODY STRUCTURE

TECHNICAL FIELD

The present invention relates to a vehicle body structure, in particular, to a vehicle upper body structure in which a roof side rail can appropriately absorb a collision load exerted on a center pillar during a vehicle side collision.

BACKGROUND ART

Framework configuration members form a framework structure of a vehicle, and include a front pillar, a center pillar, a rear pillar, a roof side rail, a rocker, and the like. The front pillar is provided in a front portion of the vehicle. The center pillar is provided in a center portion of the vehicle in a longitudinal direction. The rear pillar is provided in a rear portion of the vehicle. The roof side rail is provided in an upper portion of the vehicle. The rocker is provided in a lower portion of the vehicle.

The framework structure of the vehicle is known in which the absorption of an impact is efficiently performed by controlling a deformation mode of the framework configuration member, which results from a side collision or the like. For example, Patent Literature 1 discloses a vehicle side body structure that includes a side sill that is provided in each of right and left lower portions of a vehicle body so as to extend in the longitudinal direction; a side roof rail that is provided in each of right and left upper portions of the vehicle body so as to extend in the longitudinal direction; the center pillar that is provided in each of right and left side portions of the vehicle body so as to extend in a vertical direction, and has upper and lower ends joined to the side roof rail and the side sill, respectively; and sill reinforcement portions that are provided along the side sill from the lower end of the center pillar at spots equally spaced apart in the longitudinal direction of the vehicle body. In the vehicle side body structure, a pair of sill reinforcement portions counteracts a torsional force exerted on the center pillar, and thus suppresses a torsional deformation of the center pillar.

CITATION LIST

Patent Literature

[Patent Literature 1] Japanese Unexamined Patent Application Publication No. 2001-163263

SUMMARY OF INVENTION

Technical Problem

In the vehicle side body structure described in Patent Literature 1, when a collision load is input to the center pillar from a side surface of the vehicle, the upper end of the center pillar is drawn downwardly, and thus torsion occurs in the roof side rail at a position close to the center pillar. When the torsion occurs in the roof side rail at the position close to the center pillar, a joining spot of the center pillar in the roof side rail is drawn downwardly, and thus the center pillar is likely to be considerably deformed.

An object of the present invention is to provide a vehicle body structure in which it is possible to improve a side collision performance of a vehicle.

Solution to Problem

A vehicle body structure according to the present invention includes a roof side rail that is disposed at an upper side position of a vehicle, and extends in a longitudinal direction of the vehicle; and a center pillar which extends in a vertical direction of the vehicle, and an upper end portion of which is joined to the roof side rail at a position in the way in which the roof side rail extends. A fragile portion is provided at a position apart from a joining spot of the center pillar in the roof side rail so as to have strength lower than that of other portions of the roof side rail.

In the vehicle body structure of the present invention, each of the fragile portions has strength lower than that of the other portions of the roof side rail, and is provided at the position apart from the joining spot of the center pillar in the roof side rail. Accordingly, when a collision load is input to the center pillar from a side surface of the vehicle, torsion occurs in the roof side rail, with each of the fragile portions having strength lower than that of the other portions as a starting point of the torsion. As a result, it is possible to control a deformation of the roof side rail depending on the positions of the fragile portions. In the vehicle body structure, it is possible to improve a side collision performance of the vehicle.

The vehicle body structure may further include a front pillar that extends in the vertical direction of the vehicle, and is joined to a front end portion of the roof side rail. The fragile portion may be provided closer to the front pillar than a middle position between the center pillar and the front pillar.

In this configuration, torsion occurs in the roof side rail, having the fragile portion, which is provided closer to the front pillar than the middle position between the center pillar and the front pillar, as a starting point of the torsion. For this reason, the torsion occurs in the roof side rail, having the position apart from the joining spot of the center pillar in the roof side rail as a starting point of the torsion, and thus the joining spot of the center pillar in the roof side rail is prevented from moving downwardly. In the vehicle body structure, it is possible to suppress the deformation of the center pillar, and improve a side collision performance of the vehicle.

The vehicle body structure may further include a rear pillar that extends in the vertical direction of the vehicle, and is joined to a rear end portion of the roof side rail. The fragile portion may be provided closer to the rear pillar than a middle position between the center pillar and the rear pillar.

In this configuration, torsion occurs in the roof side rail, having the fragile portion, which is provided closer to the rear pillar than the middle position between the center pillar and the rear pillar, as a starting point of the torsion. For this reason, the torsion occurs in the roof side rail, having the position apart from the joining spot of the center pillar in the roof, side rail as a starting point of the torsion, and thus the joining spot of the center pillar in the roof side rail is prevented from moving downwardly. In the vehicle body structure, it is possible to suppress the deformation of the center pillar, and improve a side collision performance of the vehicle.

Advantageous Effects of Invention

According to the present invention, it is possible to improve a side collision performance of the vehicle.

DESCRIPTION OF EMBODIMENTS

Hereinafter, a suitable embodiment of the present invention will be described with reference to the accompanying drawings. In the description of the drawings, the same reference signs will be assigned to the same elements, and the descriptions thereof will not be repeated. For illustrative purposes, dimensional ratios of the drawings do not necessarily coincide with those of the descriptions.

Figure 1:
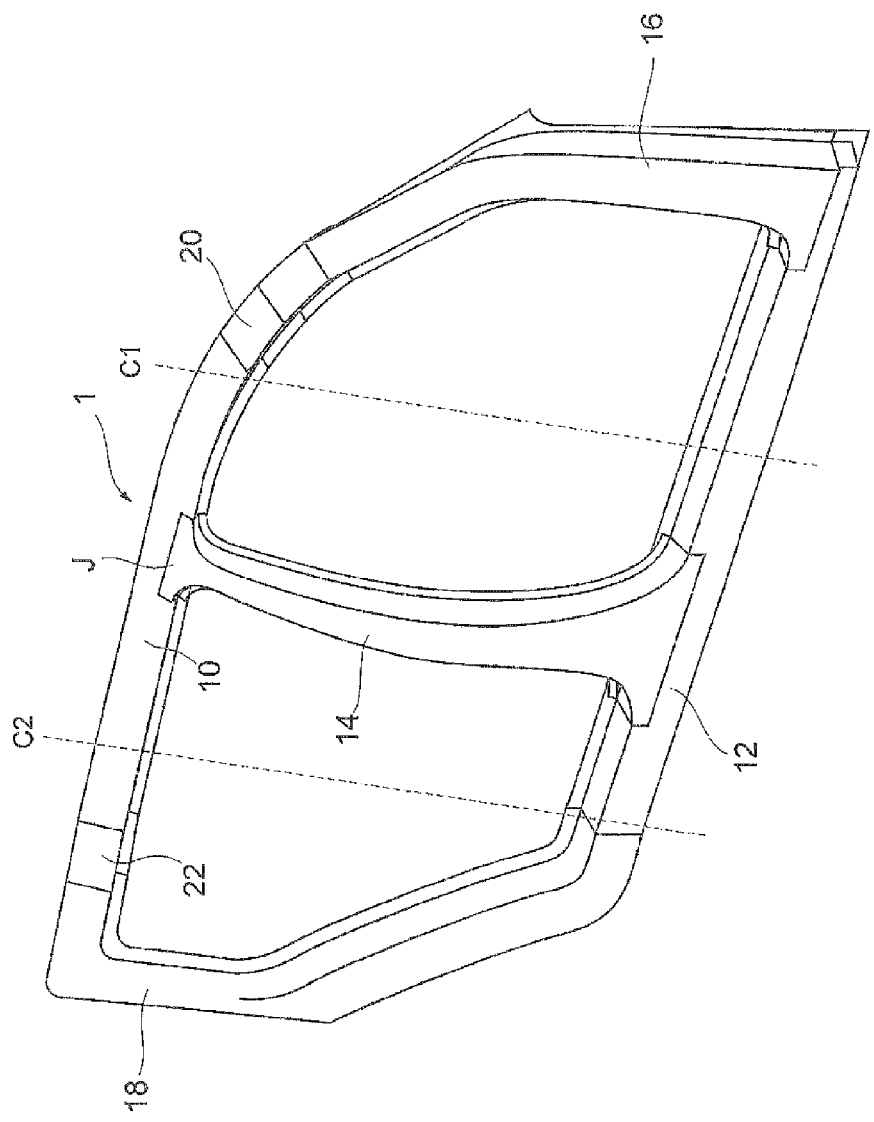
FIG. 1 is a perspective view of a vehicle body structure according to an embodiment.

FIG. 1 is a perspective view of a vehicle body structure according to the embodiment of the present invention. As illustrated in FIG. 1, a vehicle body structure 1 according to the embodiment is a side member structure, and includes the following framework configuration members: a roof side rail 10, a rocker 12, a center pillar 14, a front pillar 16, and a rear pillar 18.

The roof side rail 10 and the rocker 12 are members, each of which is disposed at a side position of a vehicle so as to extend in a longitudinal direction of the vehicle, and function as members that absorb energy along with the center pillar 14, the front pillar 16, and the rear pillar 18 during a side collision.

The roof side rail 10 is disposed on an upper side of the vehicle, and the rocker 12 is disposed on a lower side of the vehicle. The roof side rail 10 is formed by placing outer and inner roof side rails to face each other, and joining together the outer and the inner roof side rails. The rocker 12 is formed by placing outer and inner rockers to face each other, and joining together the outer and the inner rockers.

The center pillar 14, the front pillar 16, and the rear pillar 18 are members, each of which extends in a vertical direction of the vehicle, and function as members that absorb energy during a side collision. The center pillar 14 is disposed in a substantially center portion of the vehicle in the longitudinal direction. An upper end portion of the center pillar 14 is joined at a joining spot J positioned in the way in which the roof side rail 10 extends. A lower end portion of the center pillar 14 is joined to the rocker 12 at a position in the way in which the rocker 12 extends. The center pillar 14 is formed by placing outer and inner center pillars to face each other, and joining together the outer and the inner center pillars.

The front pillar 16 is disposed in a front portion of the vehicle having the vehicle body structure 1. An upper end portion of the front pillar 16 is joined to a front end portion of the roof side rail 10, and a lower end portion of the front pillar 16 is joined to a front end portion of the rocker 12. The front pillar 16 is formed by placing outer and inner front pillars to face each other, and joining together the outer and the inner front pillars.

The rear pillar 18 is disposed in a rear portion of the vehicle having the vehicle body structure 1. An upper end portion of the rear pillar 18 is joined to a rear end portion of the roof side rail 10, and a lower end portion of the rear pillar 18 is joined to a rear end portion of the rocker 12. The rear pillar 18 is formed by placing outer and inner rear pillars to face each other, and joining together the outer and the inner rear pillars.

Fragile portions 20 and 22 are front and rear portions of the roof side rail 10, respectively, and are provided at positions apart from the joining spot J of the center pillar 14. The fragile portions 20 and 22 function as members, each of which becomes a starting point for the deformation of the roof side rail 10 when a side collision occurs. Each of the fragile portions 20 and 22 of the roof side rail 10 has strength lower than that of other portions of the roof side rail 10. The fragile portions 20 and 22 may be components made of a material having strength lower than that of the roof side rail 10, and opposite end portions of each of the fragile portions 20 and 22 may be joined to the roof side rail 10 by welding.

In the embodiment, the fragile portion 20 is provided closer to the front pillar 16 than a middle position C1 between the center pillar 14 and the front pillar 16. The fragile portion 22 is provided closer to the rear pillar 18 than a middle position C2 between the center pillar 14 and the rear pillar 18.

Subsequently, an operation and an effect of the vehicle body structure 1 according to the embodiment will be described with reference to FIGS. 2 and 3. First, deformation profiles of a vehicle body structure 1A of the related art will be described in comparison with the vehicle body structure 1 for easy understanding of the operation and the effect of the vehicle body structure according to the embodiment. The vehicle body structure 1A of the related art is different from the vehicle body structure 1 in that the vehicle body structure 1A has the roof side rail 10 without the fragile portions 20 and 22.

Figure 2:
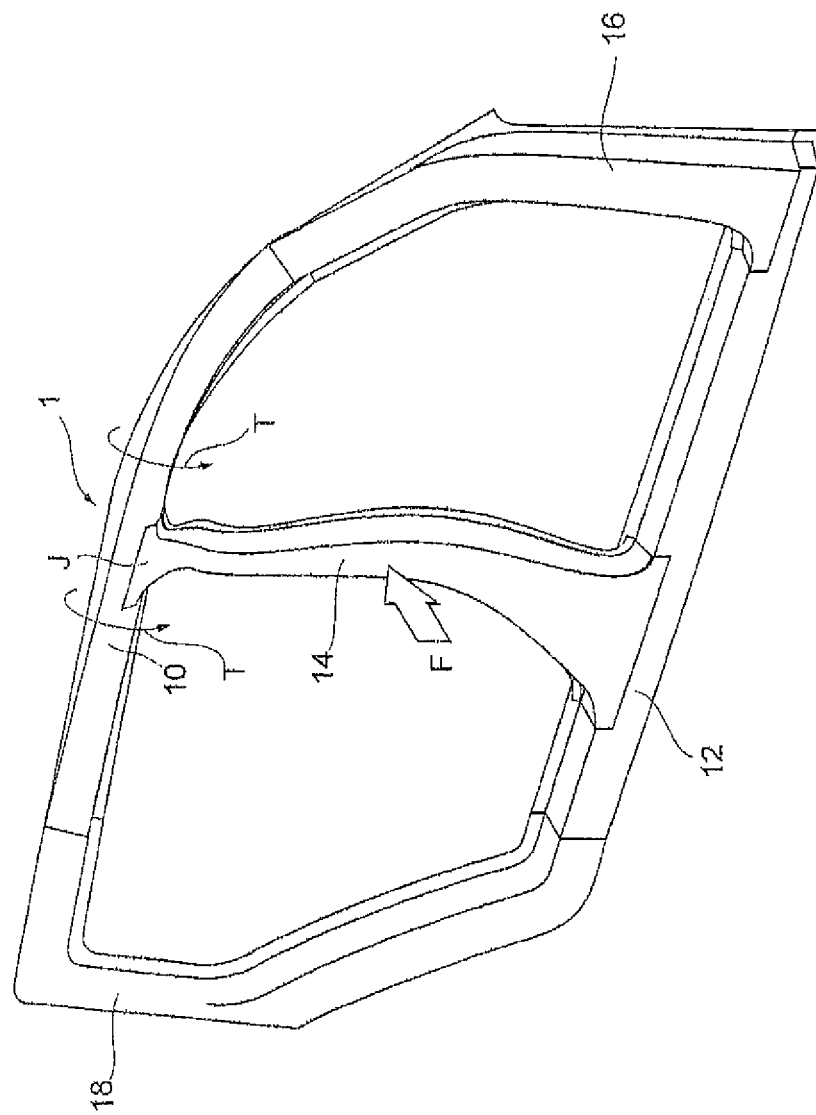
FIG. 2 is a perspective view illustrating deformation profiles of a vehicle body structure of the related art when a collision load is input from a side of a vehicle.

FIG. 2 is a perspective view illustrating the deformation profiles of the vehicle body structure 1A of the related art when a load F is input from the side of the vehicle by the collision of the vehicle with another vehicle or the like. As illustrated in FIG. 2, when the load F is input from the side of the vehicle, at an initial stage of the collision, the center pillar 14 absorbs a part of the input load F while being deformed inwardly in a lateral direction of the vehicle. At this time, a load is input to the roof side rail 10 inwardly in the lateral direction of the vehicle, and a load is input to the roof side rail 10 downwardly because the center pillar 14 is pulled downwardly.

The roof side rail 10 is drawn downwardly by the downward load, and thus torsion occurs in the roof side rail 10 of the vehicle body structure 1A of the related art. Since the downward load input to the roof side rail 10 becomes large to the extent that a load application point is close to the joining spot J of the center pillar 14, as illustrated in FIG. 2, torsion T occurs in the roof side rail 10, having a position close to the joining spot J of the center pillar 14 as a starting point of the torsion. At this time, the joining spot J of the roof side rail 10 moves downwardly by a considerable amount, and the upper end portion of the center pillar 14 moves downwardly along with the roof side rail 10. When the upper end portion of the center pillar 14 moves downwardly, the center pillar 14 is considerably deformed inwardly in the lateral direction of the vehicle. In the vehicle body structure 1A of the related art, when the load F is input from the side, the torsion T occurs at a position close to the joining spot J, which is a starting point of the torsion. Accordingly, the center pillar 14 is considerably deformed inwardly in the lateral direction of the vehicle, thereby deteriorating a side collision performance of the vehicle.

Figure 3:
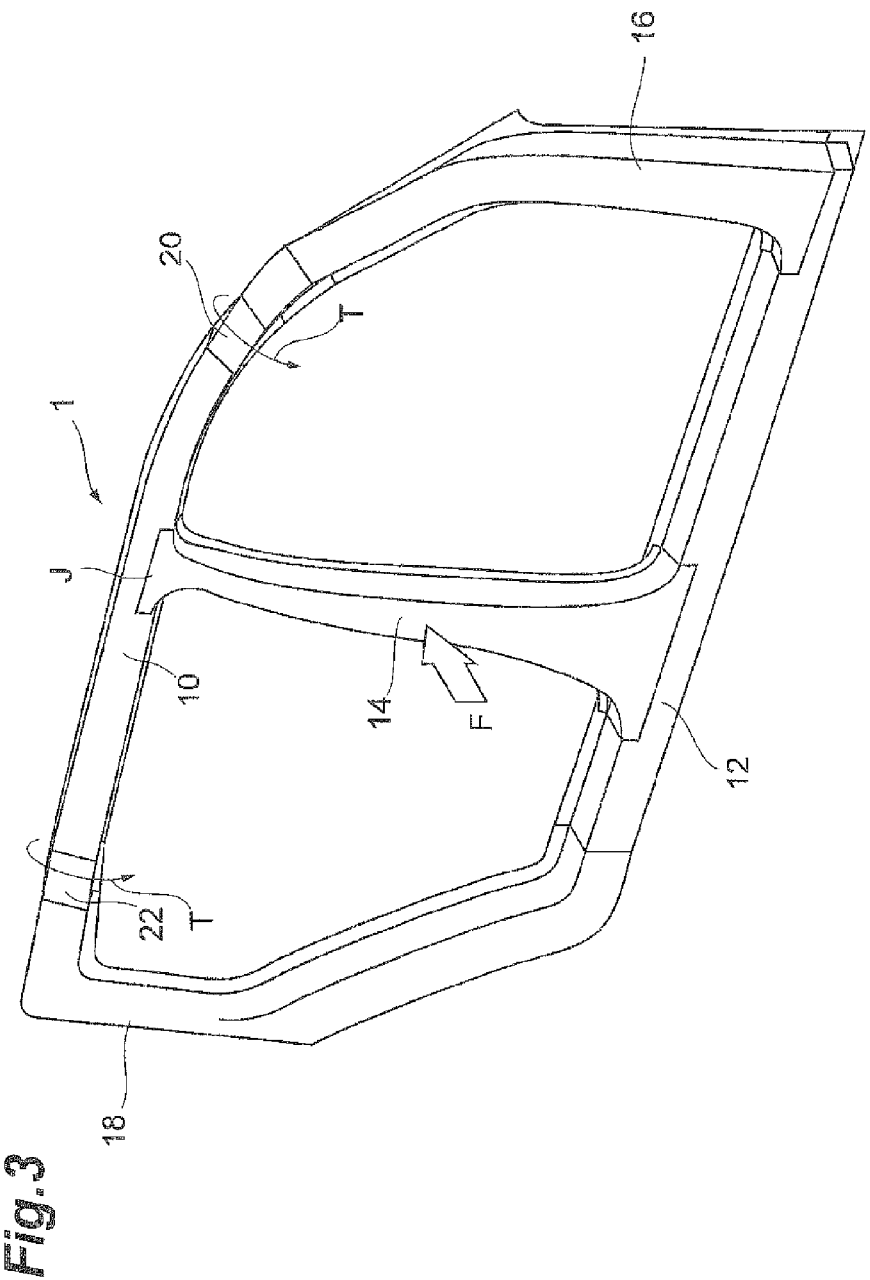
FIG. 3 is a perspective view illustrating deformation profiles of the vehicle body structure according to the embodiment when a collision load is input from the side of the vehicle.

In contrast, FIG. 3 is a perspective view illustrating deformation profiles of the vehicle body structure 1 according to the embodiment when the load F is input from the side of the vehicle by the collision of the vehicle with another vehicle or the like. In the vehicle body structure 1, similarly to in FIG. 2, when the load F is input from the side of the vehicle, at an initial stage of the collision, the center pillar 14 is deformed inwardly in the lateral direction of the vehicle, loads are input to the roof side rail 10 inwardly in the lateral direction of the vehicle and downwardly, respectively.

The roof side rail 10 is drawn downwardly by the downward load, and thus torsion occurs in the roof side rail 10 of the vehicle body structure 1. Since each of the fragile portions 20 and 22 is provided in the vehicle body structure 1 so as to have strength lower than that of other portions of the roof side rail 10, as illustrated in FIG. 3, the torsion T occurs in the roof side rail 10, having a provision position of each of the fragile portions 20 and 22 as a starting point of the torsion. At this time, since substantially the entirety of the roof side rail 10 undergoes the torsion, the joining spot J of the roof side rail 10 moves downwardly by a relatively small amount compared to the vehicle body structure 1A of the related art. For this reason, the upper end portion of the center pillar 14 moves downwardly by only a small amount, and the center pillar 14 is deformed inwardly in the lateral direction of the vehicle by a small amount Since the torsion T occurs in the vehicle body structure 1 at each position apart from the joining spot J between the roof side rail 10 and the center pillar 14 as a starting point of the torsion, the center pillar 14 is prevented from being deformed inwardly in the lateral direction of the vehicle.

As described above, in the vehicle body structure 1, each of the fragile portions 20 and 22 has strength lower than that of the other portions of the roof side rail 10, and is provided at the position apart from the joining spot J of the center pillar 14 in the roof side rail 10. Accordingly, when the collision load F is input to the center pillar 14 from the side surface of the vehicle, the torsion occurs in the roof side rail 10, with each of the fragile portions 20 and 22 having strength lower than that of the other portions as a starting point of the torsion. As a result, it is possible to control the deformation of the roof side rail 10 depending on the positions of the fragile portions 20 and 22. In the vehicle body structure 1, it is possible to improve a side collision performance of the vehicle.

The vehicle body structure 1 further includes the front pillar 16 that extends in the vertical direction of the vehicle, and that is joined to the front end portion of the roof side rail 10. The fragile portion 20 is provided closer to the front pillar 16 than the middle position C1 between the center pillar 14 and the front pillar 16. For this reason, torsion occurs in the roof side rail 10, having the fragile portion 20, which is provided closer to the front pillar 16 than the middle position C1 between the center pillar 14 and the front pillar 16, as a starting point of the torsion. The torsion occurs in the roof side rail 10, having the position apart from the joining spot J of the center pillar 14 in the roof side rail 10 as a starting point of the torsion, and thus the joining spot J of the center pillar 14 in the roof side rail 10 is prevented from moving downwardly. In the vehicle body structure 1, it is possible to suppress the deformation of the center pillar 14, and improve a side collision performance of the vehicle.

The vehicle body structure 1 further includes the rear pillar 18 that extends in the vertical direction of the vehicle, and that is joined to the rear end portion of the roof side rail 10. The fragile portion 22 is provided closer to the rear pillar 18 than the middle position C2 between the center pillar 14 and the rear pillar 18. For this reason, torsion occurs in the roof side rail 10, having the fragile portion 22, which is provided closer to the rear pillar 18 than the middle position C2 between the center pillar 14 and the rear pillar 18, as a starting point of the torsion. The torsion occurs in the roof side rail 10, having the position apart from the joining spot J of the center pillar 14 in the roof side rail 10 as a starting point of the torsion, and thus the joining spot J of the center pillar 14 in the roof side rail 10 is prevented from moving downwardly. In the vehicle body structure 1, it is possible to suppress the deformation of the center pillar 14, and improve a side collision performance of the vehicle.

The embodiment of the present invention is described above, but the present invention is not limited to the embodiment. For example, in the embodiment, the fragile portions 20 and 22 are respectively provided in the front and the rear portions of the roof side rail 10. However, at least one of the fragile portions 20 and 22 may be provided.

In the embodiment, each of the fragile portions 20 and 22 is made of a material having low strength, and thus has strength lower than that of the other portions of the roof side rail 10. However, the strength may be decreased by any method. For example, each of the fragile portions 20 and 22 may have low strength by decreasing the thickness of each fragile portion to be smaller than that of the other portions of the roof side rail 10. It is not necessary that the fragile portions 20 and 22 be configured as definitely separate components, and the fragile portions be then joined to the roof side rail 10. The fragile portions 20 and 22 may be formed integrally with the roof side rail 10.

REFERENCE SIGNS LIST

1: vehicle body structure
10: roof side rail
12: rocker
14: center pillar
16: front pillar
18: rear pillar
20, 22: fragile portion

The invention claimed is:
1. A vehicle body structure comprising:
a roof side rail that is disposed at an upper side position of a vehicle, and extends in a longitudinal direction of the vehicle;
a center pillar which extends in a vertical direction of the vehicle, and an upper end portion of which is joined to the roof side rail at a position in the way in which the roof side rail extends;
a front pillar that extends in the vertical direction of the vehicle, and is joined to a front end portion of the roof side rail; and
a rear pillar to extends in the vertical direction of the vehicle, and is joined to a rear end portion of the roof side rail,
wherein a first fragile portion and a second fragile portion are provided at positions apart from a joining spot of the center pillar in the roof side rail so as to have strength lower than that of other portions of the roof side rail, and
wherein the first fragile portion is provided closer to the front pillar than a middle portion between the center pillar and the front pillar, and the second fragile portion is provided closer to the rear pillar than a middle portion between the center pillar and the rear pillar.

* * * * *